(12) United States Patent
Varadarajan et al.

(10) Patent No.: US 6,187,895 B1
(45) Date of Patent: Feb. 13, 2001

(54) METHOD FOR PREPARING POLYMERS BY SOLID STATE POLYMERIZATION

(75) Inventors: Godavarthi Satyana Varadarajan, Dallas, TX (US); James Day, Scotia, NY (US); Bhaskar Bhairavnath Idage, Pune (IN)

(73) Assignee: General Electric Company, Schenectady, NY (US)

( * ) Notice: Under 35 U.S.C. 154(b), the term of this patent shall be extended for 0 days.

(21) Appl. No.: 09/370,435

(22) Filed: Aug. 9, 1999

(51) Int. Cl.$^7$ .................................................. C08G 64/00
(52) U.S. Cl. ........................................... 528/196; 528/198
(58) Field of Search ..................................... 528/196, 198

(56) References Cited

U.S. PATENT DOCUMENTS

| | | | |
|---|---|---|---|
| 4,948,871 | 8/1990 | Fukuoka et al. | ..................... 528/481 |
| 5,204,377 | 4/1993 | Fukawa et al. | ........................ 521/60 |
| 5,905,135 | 5/1999 | Idage et al. | ........................... 528/196 |

FOREIGN PATENT DOCUMENTS

| | | |
|---|---|---|
| 338085A1 | 10/1989 | (EP) . |
| 849305A2 | 6/1998 | (EP) . |
| 9856856 | 12/1998 | (WO) . |

*Primary Examiner*—Terressa M. Boykin
(74) *Attorney, Agent, or Firm*—Noreen C. Johnson; Douglas E. Stoner

(57) ABSTRACT

Solid state polymerization of polycarbonates and polyesters is preceded by a step of contacting particles of an amorphous precursor polymer with a particulate material, typically a crystallized polycarbonate, which prevents adherence of the precursor polymer particles to each other. It is then possible to perform the solid state polymerization step without crystallizing the precursor polymer.

22 Claims, No Drawings

METHOD FOR PREPARING POLYMERS BY SOLID STATE POLYMERIZATION

BACKGROUND OF THE INVENTION

This invention relates to the preparation of polymers, and more particularly to their preparation by solid state polymerization.

Solid state polymerization (SSP) as a method for preparing polycarbonates is disclosed, for example, in U.S. Pat. Nos. 4,948,871, 5,204,377 and 5,717,056, the disclosures of which are incorporated herein. It is typically described as involving a first step of forming, typically by melt polymerization (i.e., transesterification) of a dihydroxyaromatic compound such as 2,2-bis(4-hydroxyphenyl)propane (bisphenol A) with a diaryl carbonate such as diphenyl carbonate, a precursor polycarbonate which is often (though not necessarily) an oligomer; a second step of enhancing the crystallinity of the precursor polycarbonate; and a third step of building molecular weight by heating the enhanced crystallinity precursor polycarbonate to a temperature between its glass transition temperature and its melting temperature. Use of this method is of increasing interest by reason of its effectiveness and environmental benefits. A similar method is used for polyesters, especially bottle grade poly(ethylene terephthalate), for which an oligomer is prepared by the reaction of a dicarboxylic acid ester with a diol and is then crystallized and subjected to SSP to build molecular weight.

The crystallinity enhancement step is considered essential in accordance with the aforementioned prior art. As taught, for example, in U.S. Pat. No. 4,948,871, the crystallinity of the precursor polycarbonate should be in the range of about 5–55% as determined, for example, from powder X-ray diffraction patterns. If it is below 5%, the melting point of the precursor polycarbonate is so low that melting rather than SSP may occur. On the other hand, at crystallinity levels greater than 55% the polymerization rate is too low to be practical.

Crystallinity enhancement may be performed by several methods. These include heat treatment, solvent treatment, action of crystallization promoters and treatment with swelling agents. Each of these methods requires time input and/or treatment with extraneous chemicals which must be kept in inventory and stored. It would be desirable, therefore, to develop an SSP method which does not require the crystallinity enhancement step.

SUMMARY OF THE INVENTION

The present invention is based on the discovery that the principal effect of enhancement of crystallinity is to provide a crystalline coating for the amorphous polymer particles, ensuring that they do not adhere to each other. Thus, condensation of polymer molecules with evolution of hydroxyaromatic compound, typically phenol, or diol in the case of polyesters occurs readily with an increase in molecular weight. In fact, SSP occurs readily and rapidly in the amorphous polymer phase if the desired coating is present, whether or not the overall crystallinity of the material is within the prior art-mandated range.

Accordingly, the invention in one of its aspects is a method for preparing a polymer by solid state polymerization which comprises:

(A) contacting particles of an amorphous precursor polymer selected from the group consisting of polycarbonates and polyesters with at least one other particulate material having a melting point higher than the glass transition temperature of said precursor polymer, under conditions whereby said particulate material coats said particles to produce a coated polymer composition comprising a major proportion of said amorphous precursor polymer; and (B) subjecting said coated polymer composition to solid state polymerization conditions.

Another aspect of the invention is a coated precursor polymer composition comprising particles of which the major proportion is amorphous, said particles having a surface layer of at least one other particulate material as described above.

DETAILED DESCRIPTION; PREFERRED EMBODIMENTS

The method of this invention may be performed on polycarbonates or polyesters. Suitable polyesters include principally the linear polyesters such as poly(ethylene terephthalate) and poly(1,4-butylene terephthalate). For the sake of brevity, the method will be principally described with respect to polycarbonates, but it should be understood that it is equally applicable to polyesters.

As used herein, "polycarbonate" includes copolycarbonates and polyestercarbonates. Suitable amorphous precursor polycarbonates for use in step A of the method of the invention may be oligomers, prepared, for example, by the first step of a melt polycarbonate process or by bischloroformate oligomer preparation followed by hydrolysis and/or endcapping and isolation. Such oligomers most often have an intrinsic viscosity in the range of 0.06–0.30 dl/g, all intrinsic viscosity values herein being as determined in chloroform at 25° C.

The amorphous precursor polycarbonate may also be a high molecular weight homo- or copolycarbonate; i.e., one having an intrinsic viscosity above 0.30 dl/g. Numerous kinds of high molecular weight homo- and copolycarbonates are suitable, including conventional linear polycarbonates in virgin form. They may be prepared from any of the known dihydroxy compounds useful as monomers, including dihydroxyaromatic compounds such as bisphenol A, SBI and others designated by name or structural formula (generic or specific) in U.S. Pat. No. 4,217,438, the disclosure of which is incorporated by reference herein.

Also included are branched polycarbonates, formed by the reaction of a linear polycarbonate or its precursor(s) with a branching agent such as 1,1,1-tris(4-hydroxyphenyl) ethane. Copolycarbonates, particularly copolycarbonate oligomers and high molecular weight copolycarbonates containing units adapted to maximize solvent resistance, are also suitable. Such solvent resistance-maximizing units will typically comprise about 25–50% of total carbonate units in the polymer.

Recycled polycarbonates, for example from compact disks, may also be employed. Such recycled material typically has a molecular weight which has been degraded from that of the originally polymerized material as shown by an intrinsic viscosity in the range of about 0.25–1.0 dl/g. It may he obtained from scrap polycarbonate by dissolution in a chlorinated organic solvent such as chloroform, methylene chloride or 1,2-dichloroethane followed by filtration of the insoluble material or by other art-recognized procedures for separation of non-polycarbonate constituents. Other types of polycarbonate, such as interfacially prepared polycarbonate and polycarbonate extruder wastes, may also be employed as precursors.

For the most part, bisphenol A homo- and copolycarbonates are preferred in the method of the invention by reason of their commercial availability, relatively low cost and particular suitability.

In step A, particles of the amorphous precursor polycarbonate are contacted with at least one other particulate material, hereinafter sometimes "coating material". By "particulate material" is meant any substance existing in the form of crystals or amorphous particles and suitable for coating of the precursor polycarbonate particles. The latter may be of any size, typically from about 100 microns to about 5 mm. A particle size larger than about 5 mm is generally disadvantageous since it may be difficult for hydroxyaromatic compound evolved in the SSP step to escape from the central regions of such large particles.

Thus, suitable coating materials include those useful as pigments and fillers. Among them are relatively inert inorganic substances such as sand, talc, titanium dioxide and carbon black and numerous organic substances, including particulate polymers. Of the polymers, the preferred ones are polycarbonates and especially those containing the same structural units as the precursor polycarbonate. Most preferred are crystalline polycarbonates, which may be prepared by art-recognized methods including those disclosed in the previously identified patents. The term "crystalline" with reference to polycarbonates, when used herein, includes partially crystalline polycarbonates, typically those having a crystallinity in the range of about 5–60%.

Thus, it is within the scope of the invention for the precursor polycarbonate and the coating material to be polycarbonates of the same molecular structure. However, the precursor polycarbonate must be amorphous and the coating material will preferably be crystalline.

The proportion of coating material employed is not critical, so long as the coated polycarbonate composition comprises a major proportion of said precursor polycarbonate. The coating material will generally comprise about 2–20% and preferably about 2–10% by weight of the coated polycarbonate composition.

The conditions of step A are such that the coating material coats the particles of the precursor polycarbonate. In general, such conditions will include heating to a temperature at which the precursor polycarbonate softens but which is no higher than the melting temperature of the coating material or the decomposition temperature of the precursor polycarbonate or coating material, whichever is lower. Temperatures within the range of about 120–250° C. are usually preferred. It is within the scope of the invention for the heating operation of step A to coincide with the initial portion of the heating operation of step B.

The product of step A is the coated precursor polycarbonate composition of the invention. The surface layer thereof prevents adherence of the particles to each other, thus ensuring that the particles remain discrete during the SSP reaction (step B).

Step B is effected at a temperature above the glass transition temperature of the precursor polycarbonate and below the melting temperature of the coating material, most often about 10–50° C. below its melting temperature when it is a crystalline polycarbonate. In general, temperatures in the range of about 150–270° and especially about i80–250° C. are suitable.

As disclosed in the aforementioned U.S. Pat. Nos. 4,948, 871, 5,204,377 and 5,717,056, the solid state polymerization step is often preferably conducted in the presence of at least one catalyst. Suitable catalysts include those effective in such polycarbonate reactions as melt polymerization, redistribution, equilibration and solid state polymerization.

A wide variety of bases and Lewis acids are useful for this purpose. They include the catalysts disclosed in U.S. Pat. No. 5,414,057 and in the aforementioned U.S. Pat. No. 5,717,056, examples of which are alkali metal hydroxides and alkoxides; metal, especially alkali metal, hydrides and borohydrides; organotin and organotitanium compounds; aliphatic and heterocyclic amines; phosphines; and tetraalkylammonium and tetraalkylphosphonium hydroxides, alkoxides, carboxylates and tetraphenylborates. Also included are quaternary bisphenolates such as those disclosed in U.S. Pat. No. 5,756,843, the disclosure of which is incorporated by reference herein. The quaternary bisphenolates may be represented by the formula

wherein A is unsubstituted p-phenylene, Q is a monocationic carbon- and nitrogen-containing moiety containing 9–34 atoms and Y is a bridging radical in which one or two carbon atoms separate the A values. Particularly suitable quaternary bisphenolates are those in which Y is isopropylidene and Q is a hexaalkylguanidinium cation, especially hexaethylguanidinium.

Solid state polymerization may be conducted in a mixer capable of producing intimate gas-solid contact, such as a fixed bed, fluidized bed or paddle mixer, in contact with an inert gas such as nitrogen or argon which serves as the fluidizing gas if a fluidized bed is employed. Said inert gas may serve one or both of the purposes of fluidizing the mixture and volatilizing and removing by-products, including water, hydroxyaromatic compound and any volatile carbonate formed as a by-product. Programmed heating may be advantageously employed. As an alternative to conditions of intimate gas-solid contact, the polymerization may be conducted at reduced pressure, typically less than about 100 torr, preferably with efficient mixing.

The invention is illustrated by the following examples. All parts are by weight. Molecular weights are weight average (Mw) and were determined by gel permeation chromatography relative to polystyrene.

EXAMPLE 1

A bisphenol A polycarbonate oligomer (30 parts) prepared by melt polymerization and remelted to create pellets having a molecular weight of 7,500 and an average particle size of about 2.5 mm was mixed with 1.5 parts of a crystallized optical quality bisphenol A polycarbonate. The mixture was subjected to SSP by agitation in a tumble mixer under a nitrogen flow (7 SCFH) as the mixer was heated under the following regime:

125° C., 1 hour;
155° C., 1 hour;
180° C., 1 hour;
220° C., 2 hours;
230° C., 2 hours;
240° C., 2 hours.

The product was the desired polycarbonate, having a molecular weight of 25,600.

EXAMPLE 2

A 30-part sample of a bisphenol A polycarbonate oligomer, similar to that of Example 1 except that it had not been remelted and having a particle size of about 4 mm, was mixed with 3 parts of the crystallized optical quality polycarbonate of Example 1 and the mixture was heated under the same regime. The product, the desired polycarbonate, had a molecular weight of 14,600.

EXAMPLE 3

A mixture of 30 parts of amorphous optical quality bisphenol A polycarbonate pellets (Mw 28,000), 3 parts of the crystallized optical quality polycarbonate of Example 1 and 100 ppm, based on amorphous polycarbonate, of a hexaethylguanidinium bisphenolate corresponding in formula to one hexaalkylguanidinium cation, 3 protons and 2 bisphenol A anions was subjected to SSP as in Example 1 but under the following regime:

180° C., 1 hour;
220° C., 2 hours;
230° C., 2 hours;
240° C., 2 hours.

The product was the desired polycarbonate, having a molecular weight of 32,000.

What is claimed is:

1. A method for preparing a polymer by solid state polymerization which comprises:
    (A) contacting particles of an amorphous precursor polymer selected from the group consisting of polycarbonates and polyesters with at least one other particulate material having a melting point higher than the glass transition temperature of said precursor polymer, under conditions whereby said particulate material coats said particles to produce a coated polymer composition comprising a major proportion of said amorphous precursor polymer; and
    (B) subjecting said coated polymer composition to solid state polymerization conditions.

2. A method according to claim 1 wherein the precursor polymer is a polyester.

3. A method according to claim 1 wherein the precursor polymer is a polycarbonate.

4. A method according to claim 3 wherein the particulate material is a polycarbonate.

5. A method according to claim 4 wherein the particulate material contains the same structural units as the precursor polycarbonate.

6. A method according to claim 4 wherein the particulate material is a bisphenol A polycarbonate.

7. A method according to claim 4 wherein the particulate material is a crystalline polycarbonate.

8. A method according to claim 3 wherein the precursor polymer is a bisphenol A polycarbonate.

9. A method according to claim 3 wherein the precursor polymer is a polycarbonate oligomer.

10. A method according to claim 9 wherein the polycarbonate oligomer has an intrinsic viscosity in the range of about 0.06–0.30 dl/g as determined in chloroform at 25° C.

11. A method according to claim 3 wherein the coating conditions include heating to a temperature at which the precursor polycarbonate softens but which is no higher than the melting temperature of the coating material or the decomposition temperature of the precursor polycarbonate or coating material, whichever is lower.

12. A coated precursor polymer composition comprising particles of which the major proportion is amorphous, said particles having a surface layer of at least one other particulate material having a melting point higher than the glass transition temperature of said precursor polymer.

13. A method according to claim 12 wherein the precursor polymer is a polyester.

14. A method according to claim 12 wherein the precursor polymer is a polycarbonate.

15. A composition according to claim 14 wherein said surface layer prevents adherence of said particles to each other.

16. A composition according to claim 15 wherein the particulate material is a polycarbonate.

17. A composition according to claim 16 wherein the particulate material contains the same structural units as the precursor polycarbonate.

18. A composition according to claim 16 wherein the particulate material is a bisphenol A polycarbonate.

19. A composition according to claim 16 wherein the particulate material is a crystalline polycarbonate.

20. A composition according to claim 15 wherein the precursor polycarbonate is a bisphenol A polycarbonate.

21. A composition according to claim 15 wherein the precursor polycarbonate is a polycarbonate oligomer.

22. A composition according to claim 21 wherein the polycarbonate oligomer has an intrinsic viscosity in the range of about 0.06–0.30 dl/g as determined in chloroform at 25° C.

* * * * *